United States Patent
Bramhavar et al.

(10) Patent No.: US 9,778,042 B2
(45) Date of Patent: Oct. 3, 2017

(54) OPTO-MECHANICAL INERTIAL SENSOR

(71) Applicant: Intel Corporation, Santa Clara, CA (US)

(72) Inventors: Suraj Bramhavar, Mountain View, CA (US); David N. Hutchison, Santa Clara, CA (US); John Heck, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 14/106,158

(22) Filed: Dec. 13, 2013

(65) Prior Publication Data

US 2016/0195397 A1 Jul. 7, 2016

(51) Int. Cl.
*G01P 15/13* (2006.01)
*G01C 19/72* (2006.01)
(Continued)

(52) U.S. Cl.
CPC ........... *G01C 19/722* (2013.01); *G01C 19/56* (2013.01); *G01C 19/5719* (2013.01);
(Continued)

(58) Field of Classification Search
CPC ............................. G01C 19/56; G01C 19/722
(Continued)

(56) References Cited

U.S. PATENT DOCUMENTS 4,422,331 A * 12/1983 Walker ................. G01P 15/093
73/514.27
4,428,234 A * 1/1984 Walker ................. G01P 15/093
73/514.27
(Continued)

FOREIGN PATENT DOCUMENTS

CN 1743850 A 3/2006
CN 101960252 A 1/2011
(Continued)

OTHER PUBLICATIONS

U.S. Appl. No. 61/507,705, filed Jul. 2011, Bhave; Sunil.*
(Continued)

*Primary Examiner* — Lisa Caputo
*Assistant Examiner* — Tarun Sinha
(74) *Attorney, Agent, or Firm* — Schwabe, Williamson & Wyatt, P.C.

(57) ABSTRACT

Embodiments of the present disclosure are directed towards a micro-electromechanical system (MEMS) sensing apparatus, including a laser arrangement configured to generate a light beam, a first waveguide configured to receive and output the light beam, and a second waveguide aligned endface to endface with the first waveguide. The second waveguide may be configured to receive at least a portion of the light beam from the first waveguide via optical coupling through the aligned endfaces. Either the first or second waveguide may be configured to be moveable in response to an inertial change of the apparatus, wherein movement of the first or second waveguide causes a corresponding change in light intensity of the portion of the light beam, the change in light intensity indicating a measure of the inertial change. Other embodiments may be described and/or claimed.

24 Claims, 7 Drawing Sheets

(51) Int. Cl.
  *G01C 19/56* (2012.01)
  *G01P 15/093* (2006.01)
  *G01C 19/5719* (2012.01)
  *G01D 5/353* (2006.01)
  *G02B 6/42* (2006.01)
  *G01P 15/08* (2006.01)

(52) U.S. Cl.
  CPC ........ *G01D 5/35374* (2013.01); *G01P 15/093* (2013.01); *G01P 2015/084* (2013.01); *G02B 6/4225* (2013.01)

(58) Field of Classification Search
  USPC ...................................................... 73/514.26
  See application file for complete search history.

(56) References Cited

U.S. PATENT DOCUMENTS

| | | | |
|---|---|---|---|
| 4,900,918 | A | 2/1990 | Killian |
| 5,367,584 | A | 11/1994 | Ghezzo et al. |
| 5,437,186 | A | 8/1995 | Tschulena |
| 5,926,591 | A | 7/1999 | Labeye et al. |
| 6,807,331 | B2 | 10/2004 | Hsu et al. |
| 6,856,712 | B2 | 2/2005 | Fauver et al. |
| 2002/0180978 | A1 | 12/2002 | Berg et al. |
| 2003/0200803 | A1 | 10/2003 | Platt |
| 2003/0206693 | A1 | 11/2003 | Tapalian et al. |
| 2004/0156580 | A1 | 8/2004 | Baumann et al. |
| 2005/0025419 | A1 | 2/2005 | Fish et al. |
| 2005/0160816 | A1 | 7/2005 | Yu |
| 2005/0268717 | A1 | 12/2005 | Ozawa |
| 2006/0072875 | A1 | 4/2006 | Bhagavatula et al. |
| 2006/0103851 | A1 | 5/2006 | Nathan et al. |
| 2006/0169044 | A1 | 8/2006 | Hodgins et al. |
| 2006/0192974 | A1 | 8/2006 | Li |
| 2006/0198567 | A1* | 9/2006 | Levy ...................... B82Y 20/00 385/12 |
| 2006/0279862 | A1 | 12/2006 | Elata et al. |
| 2008/0202241 | A1 | 8/2008 | Le |
| 2010/0238454 | A1 | 9/2010 | Pruessner et al. |
| 2010/0290060 | A1 | 11/2010 | Mohazzab et al. |
| 2011/0030472 | A1* | 2/2011 | Aziz ...................... B81B 3/0062 73/504.12 |
| 2011/0179870 | A1 | 7/2011 | Chan et al. |
| 2011/0303008 | A1 | 12/2011 | Zhang et al. |
| 2012/0218556 | A1* | 8/2012 | Dell ................... G01N 21/7703 356/478 |
| 2013/0330232 | A1 | 12/2013 | Pruessner et al. |
| 2014/0260614 | A1* | 9/2014 | Bhave ................ G01C 19/5677 73/514.26 |
| 2014/0283601 | A1 | 9/2014 | Bhave et al. |
| 2015/0285633 | A1 | 10/2015 | Kamal Said Abdel Aziz |

FOREIGN PATENT DOCUMENTS

| | | |
|---|---|---|
| EP | 1083429 A2 | 3/2001 |
| GB | 2493585 A | 2/2013 |
| JP | 1994050984 A | 2/1994 |
| JP | 2002250885 A | 9/2002 |
| JP | 2006064977 A | 3/2006 |
| JP | 2005524077 A | 8/2006 |
| JP | 2008534979 A | 8/2008 |
| JP | 2012528335 A | 11/2012 |
| KR | 1020030080637 A | 10/2003 |
| TW | I265277 B | 11/2006 |
| WO | 0071981 A1 | 11/2000 |
| WO | 2013052953 A1 | 4/2013 |

OTHER PUBLICATIONS

Office Action and Search Report mailed Oct. 2, 2015, in corresponding Taiwan Patent Application No. 103139210, 16 pages.
Hutchison, D.N., et al., "Z-Axis Optomechanical Accelerometer," IEEE, MEMS 2012, Paris, France, Jan. 29-Feb. 2, 2012, pp. 615-619.
Non-Final Office Action mailed Sep. 25, 2015, issued in related U.S. Appl. No. 14/106,172, filed Dec. 13, 2013, 29 pages.
Taiwan Office Action for TW Application No. 103138911, dated Jul. 6, 2015, 14 pages.
Taiwan Office Action for TW Application No. 103139067, dated Jul. 21, 2015, 14 pages.
Taiwan Office Action for TW Application No. 103139069, dated Jul. 21, 2015, 14 pages.
International Search Report for PCT Application No. PCT/US2014/066702, dated Mar. 6, 2015, 14 pages.
International Search Report for PCT Application No. PCT/US2014/066464, dated Feb. 26, 2015, 14 pages.
International Search Report for PCT Application No. PCT/US2014/066463, dated Mar. 6, 2015, 13 pages.
International Search Report for PCT Application No. PCT/US2014/066462, dated Mar. 17, 2015, 13 pages.
International Preliminary Report on Patentability, mailed Jun. 23, 2016, issued in corresponding International Application No. PCT/US2014/066702.
Notice of Reason(s) for Rejection dated Mar. 14, 2017, issued in related Japanese Patent Application No. 2016-530005, 22 pages.
Notice of Preliminary Rejection dated May 23, 2017, issued in related Korean Patent Appln. No. 2016-7012564, 10 pages.
Notice of Preliminary Rejection dated Jun. 29, 2017, issued in related Korean Patent Appln. No. 2016-7012471, 12 pages.
Supplementary Partial European Search Report dated Jul. 13, 2017, issued in related European Application No. 14869807.9, 17 pages.

* cited by examiner

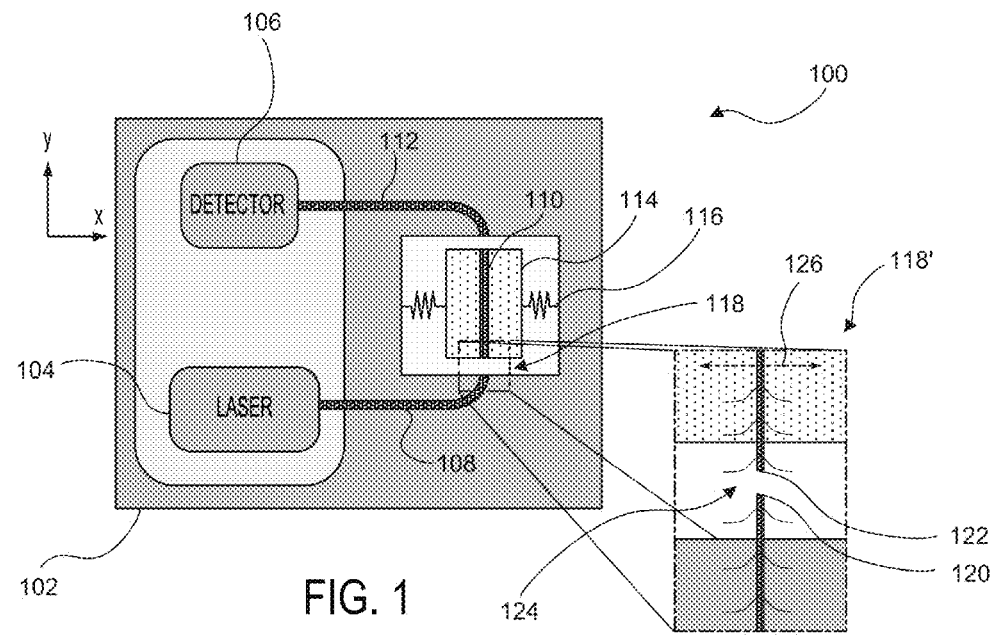
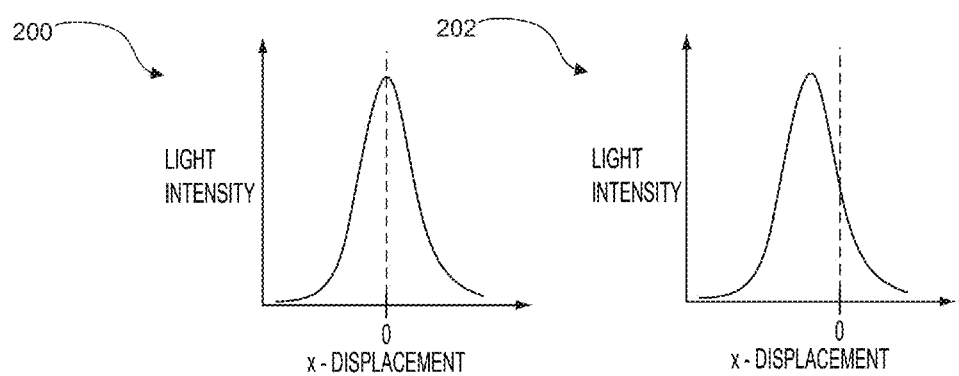
FIG. 2

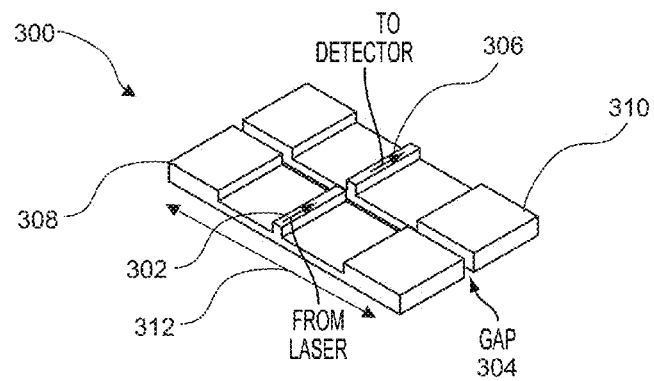
FIG. 3
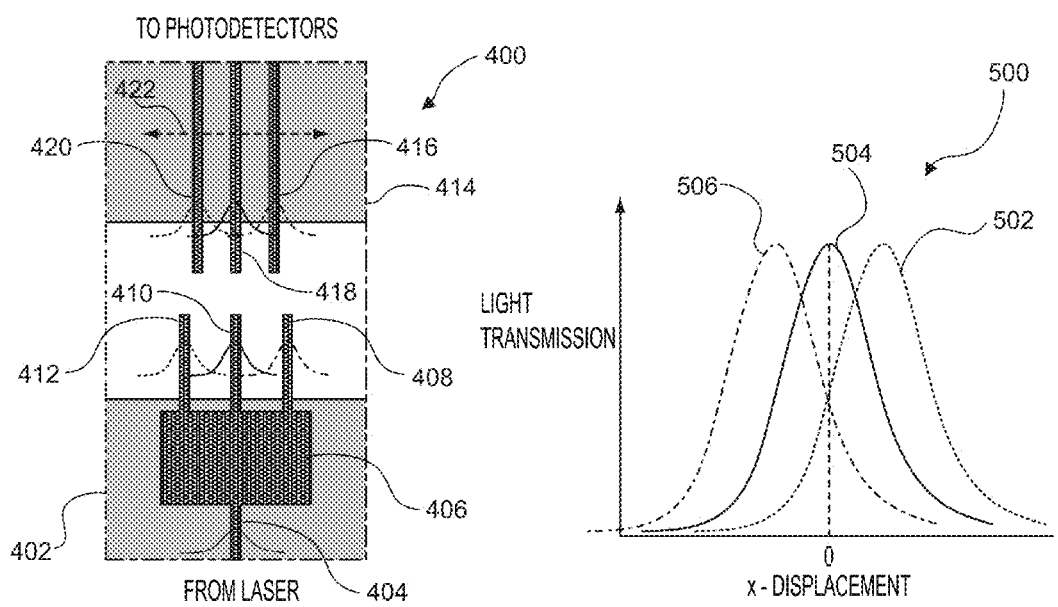
FIG. 4
FIG. 5

OPTO-MECHANICAL INERTIAL SENSOR

FIELD

Embodiments of the present disclosure generally relate to the field of opto-electronics, and more particularly, to using micro-electronic systems for accelerometric and gyroscopic measurements.

BACKGROUND

The market demands and revenues for displacement-sensing devices, such as accelerometers and gyroscopes including micro-electronic systems (MEMS)-based sensors have been growing steadily. The integration of inertial MEMS sensors into a wide range of consumer electronics, cars, and defense applications is driving the need for smaller, cheaper, lower-power, lower-noise, and more accurate sensors. However, technologies for producing micro-scale accelerometers and gyroscopes have remained essentially unchanged since their inception years ago. A typical sensor in an accelerometer or gyroscope may include a movable proof-mass with the proof-mass displacement sensed electrically, e.g., using inter-digitated capacitor plates. However, traditional electrostatic sensing may not provide sufficient sensitivity or desired sensitivity range.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 is a diagram schematically illustrating an example MEMS sensing device for sensing inertial change, in accordance with some embodiments of the present disclosure.

FIG. 2 illustrates graphs representing, according to some embodiments, the intensity of light transmitted as a function of displacement of a proof mass, in accordance with some embodiments of the present disclosure.

FIG. 3 is a schematic illustrating a portion of a MEMS sensing device for sensing inertial change, in accordance with some embodiments of the present disclosure.

FIG. 4 is a diagram schematically illustrating another embodiment of a MEMS sensing device for sensing inertial change, in accordance with some embodiments of the present disclosure.

FIG. 5 is a graph illustrating optical transmission power as a function of proof mass displacement of FIG. 1, in accordance with some embodiments of the present disclosure.

DETAILED DESCRIPTION

Figure 6:
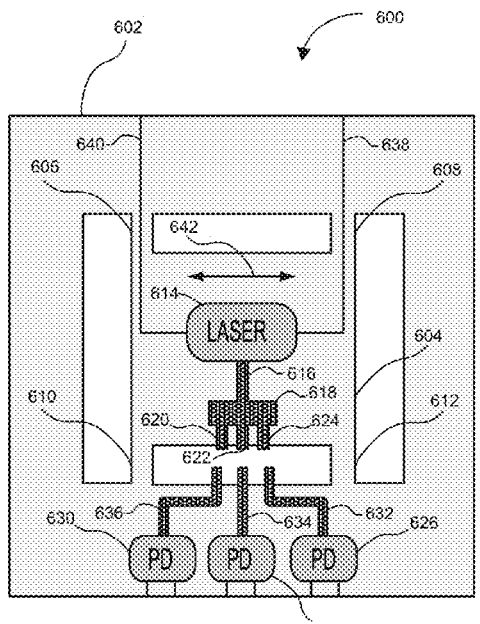
FIGS. 6-8 are diagrams schematically illustrating various configurations of MEMS sensing devices for sensing inertial change, in accordance with embodiments of the present disclosure.

Embodiments of the present disclosure describe configurations and techniques for sensing inertial changes by Micro-Electro-Mechanical Systems (MEMS). In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first layer formed, deposited, or otherwise disposed on a second layer," may mean that the first layer is formed, deposited, or disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 is a diagram schematically illustrating, according to some embodiments, an example MEMS sensing device 100 for sensing inertial change. For purposes of explanation, a section 118 of the device 100 demarcated in dashed lines is enlarged and shown within a dashed-line rectangle 118' in FIG. 1. In embodiments, device 100 may include a light source, such as laser arrangement 104, hereinafter "laser 104," configured to generate a light beam. Laser 104 may be coupled with waveguide 108 and may be configured to provide the generated light beam to waveguide 108. Waveguide 108 may be alternatively referred to as a bus waveguide and may be configured to transmit the light beam away from laser 104.

Waveguide 108 may be aligned endface 120 to endface 122 with waveguide 110. As depicted, the waveguides may be configured with cantilevered tips, e.g., the tips of the waveguides may protrude into a space between the frame and the proof mass. Endfaces 120 and 122 may be aligned across gap 124. The distance of gap 124 may be configured such that waveguide 108 and waveguide 110 may be configured to optically couple through endfaces 120 and 122. In such an arrangement, waveguide 110 may be configured to receive at least a portion of the light beam generated by laser 104 and transmitted through waveguide 108. Waveguide 110 may in turn be aligned endface to endface and configured to optically couple with waveguide 112 in a similar manner to that depicted in 118' and described above. In embodiments, waveguide 112 may then be coupled with detector 106 and may output any light received through the optical coupling with waveguide 110 to detector 106. Detector 106 may be configured to detect an amount, or intensity, of the light output to detector 106 by waveguide 112.

In embodiments, waveguides 108 and 112 may be affixed to a frame 102 such that neither waveguide 108 nor 112 move in relation to device 100. Waveguide 110 may be affixed to a proof mass 114. Proof mass 114 may be affixed to frame 102 by two or more springs, legs, or flexures, such as spring 116. In embodiments, the springs may be configured to be deformable, e.g., stretchable and/or bendable, in a single direction. This deformability may allow proof mass 114, and consequently waveguide 110, to move in a shearing motion, as depicted by arrow 126, with respect to waveguides 108 and 112 in response to an inertial change of device 100. As a result, an inertial change to device 100 may cause a movement of optical waveguide 110 such that the amount of light transferred to waveguide 110 through the optical coupling with waveguide 108 may increase or decrease. Consequently, the intensity of light transferred to waveguide 112 through the optical coupling with waveguide 110 may either increase or decrease. This increase or decrease in the intensity of light passing through waveguide 112 may be detected by detector 106. The magnitude of the increase or decrease detected by detector 106 may then be utilized in determining a magnitude of the movement of device 100. This may allow for very sensitive detection of any small motion of the proof mass and, as a result, any small motion of device 100. In embodiments, the waveguide tips may be coated with an antireflective coating or tapered in such a way to reduce or minimize back-reflection and loss. While depicted herein as waveguides with cantilever tips, a rib waveguide, such as that discussed in reference to FIG. 3, below, may be utilized in place of the cantilevered waveguides depicted.

FIG. 2 illustrates graphs representing, according to some embodiments, the intensity of light transmitted to detector 106 of FIG. 1 as a function of displacement of proof mass 114. As can be seen, the horizontal axes for both graphs 200 and 202 depict a magnitude of displacement of device 100 of FIG. 1. The vertical axes of both graphs depict the intensity of light that may be detected by detector 106 of FIG. 1. In graph 200, waveguides 108-112 of FIG. 1 may be aligned to transmit the maximum intensity of light when device 100 is in a rest position. As a result, a movement of device 100 in either direction along the x-axis may act to reduce the light intensity transmitted. Detector 106 may be configured to detect this reduction in light intensity and this detected reduction may be utilized to determine a magnitude of the movement of device 100.

In another embodiment, depicted by graph 202, waveguides 108-112 may be aligned such that less than the maximum intensity of light is transmitted when the device is in a rest position. In such an embodiment, a direction of the inertial change may be determined as a movement in one direction may result in an increase, at least initially, of the light intensity while a movement in the opposite direction may result in a decrease. Detector 106 of FIG. 1 may be configured to detect these changes in light intensity and the detected changes may be utilized to determine a magnitude of the movement of device 100.

FIG. 3 is a schematic illustrating a portion of a MEMS sensing device 300 for sensing inertial change, in accordance with some embodiments utilizing a rib waveguide. Sensing device 300 may have a rib waveguide 302 disposed on a dielectric layer 308. Rib waveguide 302 may be coupled with a laser, not depicted, configured to provide a light beam to rib waveguide 302. Rib waveguide 302 may be optically coupled with rib waveguide 306 across gap 304. Rib waveguide 306 may be disposed on a dielectric layer 310 and may be coupled with a detector, not depicted, configured to detect light intensity output by rib waveguide 306. In embodiments, either dielectric layer 308 or dielectric layer 310 may be configured to be moveable in a shearing motion as depicted by arrow 312. In embodiments where one dielectric layer (e.g., dielectric layer 308) is moveable in a shearing direction the other dielectric layer (e.g., dielectric layer 310) may be fixed with respect to the MEMS sensing device. While rib waveguides and cantilevered waveguides are discussed herein, this disclosure should not be limited to these types of waveguides and any suitable waveguide may be utilized without departing from the scope of this disclosure. Furthermore, any embodiment herein described with one type of waveguide may alternately utilize another type of waveguide in place of that described. As utilized herein waveguide may refer to a cantilever waveguide, a rib waveguide, or any other waveguide suitable for the respective embodiment.

FIG. 4 is a diagram schematically illustrating a multiplexed embodiment of a MEMS sensing device 400 for sensing inertial change. In multiplexed embodiments, a waveguide 404 coupled with a laser, such as laser 104 of FIG. 1, may have a splitter 406 as part of the waveguide. The splitter 406 may be configured to split the light beam provided by the laser into portions 408-412 of the waveguide, hereinafter referred to as waveguides 408-412 for simplicity. Waveguides 408-412 may be configured such that endfaces of waveguides 408-412 may optically couple with waveguides 416-420 respectively.

In some embodiments, as depicted, the spacing between each waveguide of one set of waveguides (e.g., waveguides 408-412) may be fractionally smaller or larger than the spacing of each waveguide of the other set of waveguides (e.g., waveguides 416-420). Such a configuration may enable a direction of the inertial change to be measured. The directionality may be determined because as one pair of optically coupled waveguides (e.g., waveguides 410 and 418) may move out of alignment another pair of optically coupled waveguides (e.g., waveguides 412 and 420) may move into alignment. As the waveguides move out of alignment, the amount of light transmitted through the optical coupling may reduce, while as the waveguides move into alignment the amount of light transmitted through the optical coupling may increase. This is demonstrated by graph 500 in FIG. 5. In embodiments, waveguides 416-420 may each be coupled with individual detectors (not depicted) configured to determine an intensity of the light output by the individual waveguides 416-420. While depicted herein as waveguides with cantilever tips, a rib waveguide, such as that discussed in reference to FIG. 3, above, may be utilized in place of the cantilevered waveguides depicted. While depicted herein as three waveguides respectively optically coupled with three segments of another waveguide, any number of waveguides and segments may be utilized depending upon the sensitivity or measurement range required of the device.

FIG. 5 is a graph 500 illustrating optical transmission power as a function of proof mass displacement of the waveguides depicted in FIG. 3, according to some embodiments. In embodiments, this graph may represent the light intensity output to and detected by the individual detectors that may be coupled with waveguides 416-420 of FIG. 4. As can be seen, the horizontal axis for graph 500 depicts a magnitude of displacement along the x axis for device 400 of FIG. 4. The vertical axis of graph 500 depicts the intensity of light detected by the individual detectors that may be coupled with waveguides 416-420. Curves 502-506 may depict the respective light intensities detected by the individual detectors coupled with waveguides 416-420.

As depicted by curve 504, waveguides 410 and 418 of FIG. 4 may be aligned such that waveguide 418 may output the maximum intensity of light when device 400 is in a rest (or initial) position. Curve 502 depicts that waveguides 408 and 416 may be aligned such that waveguide 416 may output a light intensity of less than the maximum light intensity when device 400 is in a rest position and curve 506 depicts similarly with respect to the alignment of waveguides 412 and 420. As can be seen from the graph, as the light intensity output by waveguide 418 reduces, the light intensity output by waveguides 416 and 420 increases depending upon the direction of movement of device 400. As a result, both the magnitude of the movement and a directionality of the movement may be determined by examining changes in light intensity output by waveguides 416-420.

Figure 7:
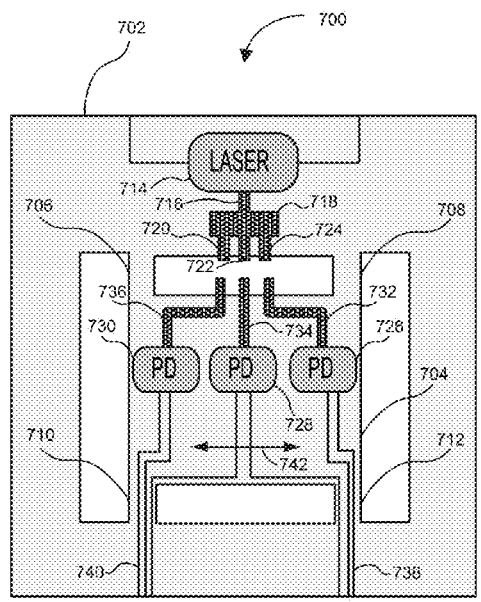
Figure 8:
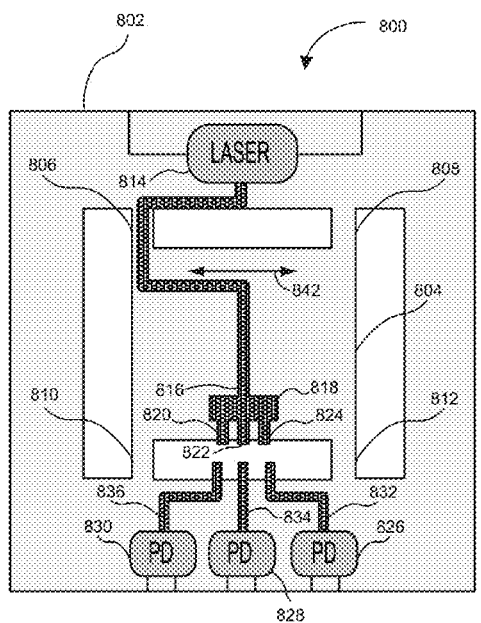

FIGS. 6-8 are diagrams schematically illustrating different configurations of a MEMS sensing device according to embodiments of the present disclosure. FIG. 6 depicts a MEMS sensing device 600 having a frame 602 and a proof mass 604 affixed to frame 602 via springs 606-612. Springs 606-612 may be configured to restrict the movement of proof mass 604 in the direction of arrow 642. In some embodiments, device 600 may further have laser 614 affixed to proof mass 604. Electrical leads 638 and 640 for laser 614 may be affixed and routed along springs 606 and 608. Laser 614 may be coupled with and configured to provide a light beam to a waveguide having an initial waveguide segment 616 routing a light beam into a waveguide splitter 618. Waveguide splitter 618 may split the light beam among additional waveguide segments 620-624. Device 600 may, in some embodiments, have photo detectors 626-630 affixed to frame 602. Photo detectors 626-630 may be coupled with waveguides 632-636, respectively. Photo detectors 626-630 may be configured to detect an amount of light output by waveguides 632-636, respectively. Device 600 may be configured such that segments 620-624 of the waveguide optically couple with waveguides 632-636. The detection of movement with such an arrangement is similar to that discussed above in reference to FIGS. 4 and 5.

FIG. 7 depicts a MEMS sensing device 700 having a frame 702 and a proof mass 704 affixed to frame 702 via springs 706-712. Springs 706-712 may be configured to restrict the movement of proof mass 704 in the direction of arrow 742. In some embodiments, device 700 may further have photo detectors 726-730 affixed to proof mass 704. Electrical leads 738 and 740 for photo detectors 726-730 may be affixed and routed along springs 710-712. Photo detectors 726-730 may be coupled with waveguides 732-736, respectively. Photo detectors 726-730 may be configured to detect an amount of light output by waveguides 732-736, respectively. Device 700 may, in some embodiments, have laser 714 affixed to frame 702. Laser 714 may be coupled with and configured to provide a light beam to a waveguide having an initial waveguide segment 716 routing a light beam into a waveguide splitter 718. Waveguide splitter 718 may split the light beam among additional waveguide segments 720-724. Device 700 may be configured such that additional waveguide segments 720-724 optically couple with waveguides 732-736. The detection of movement with such an arrangement is similar to that discussed above in reference to FIGS. 4 and 5.

FIG. 8 depicts a MEMS sensing device 800 having a frame 802 and a proof mass 804 affixed to frame 802 via springs 806-812. Springs 806-812 may be configured to restrict the movement of proof mass 804 in the direction of arrow 842. In some embodiments, device 800 may further have photo detectors 826-830 affixed to frame 804. Photo detectors 826-830 may be coupled with waveguides 832-836, respectively. Photo detectors 826-830 may be configured to detect an amount of light output by waveguides 832-836, respectively. Device 800 may, in some embodiments, also have laser 814 affixed to frame 802. Laser 814 may be coupled with, and configured to provide a light beam to, a waveguide having an initial waveguide segment 816. Initial waveguide segment 816 may be affixed and routed along spring 806 onto proof mass 804, as depicted. Initial waveguide segment may route a light beam into a waveguide splitter segment 818 of the waveguide. Waveguide splitter segment 818 may split the light beam among additional waveguide segments 820-824. Device 800 may be configured such that additional waveguide segments 820-824 optically couple with waveguides 832-836. The detection of movement with such an arrangement is similar to that discussed above in reference to FIGS. 4 and 5.

Figure 9:
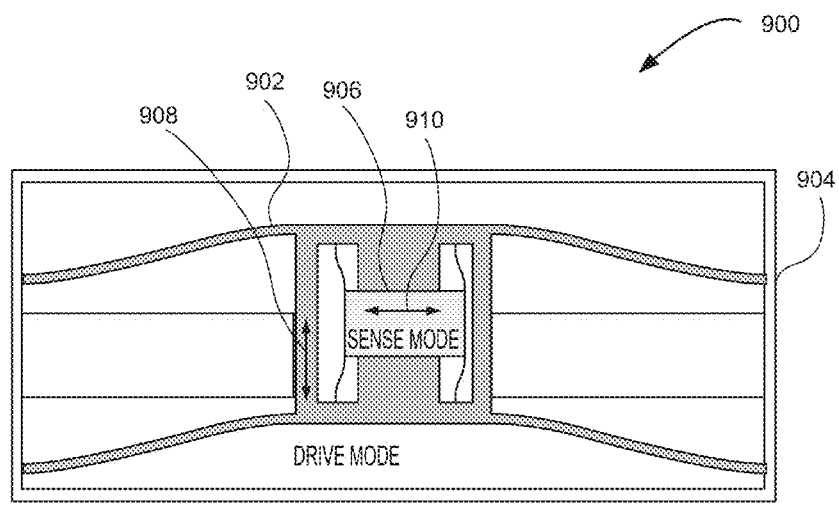
FIG. 9 as an example configuration of a MEMS sensing device comprising a gyroscope, in accordance with some embodiments.
Figures 10, 12:
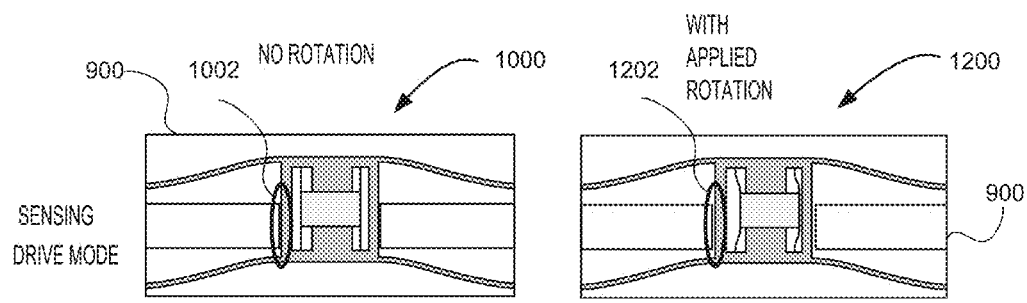
FIGS. 10-13 illustrate an example MEMS sensing device in different modes pertaining to a gyroscope, configured to measure the gyroscope's sense and drive modes with or without applied external rotation, in accordance with some embodiments.
Figures 11, 13:
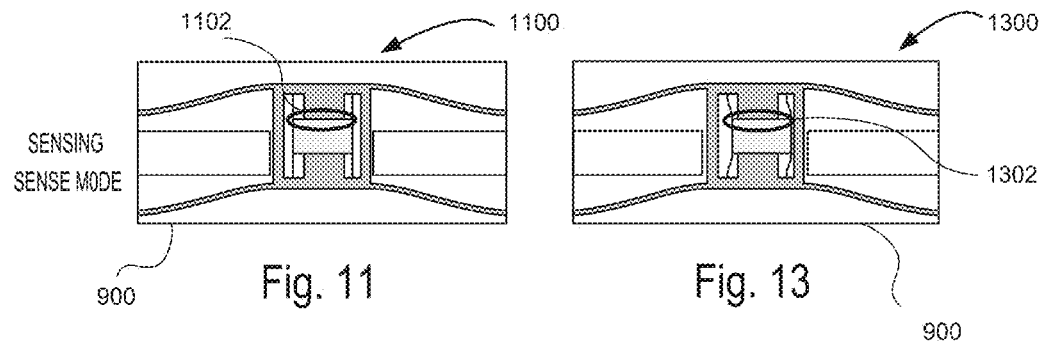

FIG. 9 as an example configuration of a MEMS sensing device 900 such as a gyroscope, in accordance with some embodiments. The sensing device 900 includes an outer proof mass 902 affixed to a fixed frame 904. The proof mass 902 may be configured similar to those described above in reference to FIGS. 1 and 6-8 and accordingly may include a sensing device similar to those described in reference to FIGS. 1 and 6-8 (not shown in FIG. 7 for simplicity). The proof mass 902 may be configured to move in the direction indicated by arrow 908 (drive mode).

The device 900 may further include an inner proof mass 906 (also configured similar to one described in reference to FIGS. 1 and 6-8 and including a similar sensing device that is not shown for simplicity) that is free to move in the direction indicated by arrow 908 (sense mode), e.g., perpendicular to the drive mode. In some embodiments, the inner proof mass 906 may be disposed within the outer proof mass 902. In other embodiments, the inner and outer proof masses 902 and 906 may be disposed separately due to inertial forces and affixed to the frame 904. The outer proof mass 902 may be excited at a determined drive frequency "$\omega$ drive," e.g., using a "drive" set of comb fingers (not shown for clarity), in order to provide for the Coriolis force (calculated to determine rotation speed) to be measurable.

FIGS. 10-13 illustrate an example MEMS sensing device 900 in different modes pertaining to gyroscope, specifically, configured to measure the gyroscope's sense and drive modes with or without applied external rotation, e.g., accelerometers 1000, 1100, 1200, and 1300 configured as described in reference to FIG. 9. More specifically, device 900 may be configured to sense the drive mode and sense mode without or with applied external rotation. For example, device 900 may sense the drive mode and sense mode without applied external rotation in states 1000 and 1100 respectively and may sense the drive mode and sense mode with applied external rotation in states 1200 and 1300 respectively. When subject to external rotation (in plane with the page), the inner proof mass 906 may move at a frequency "$\omega$sense"="$\omega$ drive." The device 900 may be configured to detect the motion of either the sense mode or the drive mode in states 1000, 1100, 1200, and 1300 at the locations of the black ellipses indicated by numerals 1002, 1102, 1202, and 1302 respectively.

Figure 14:
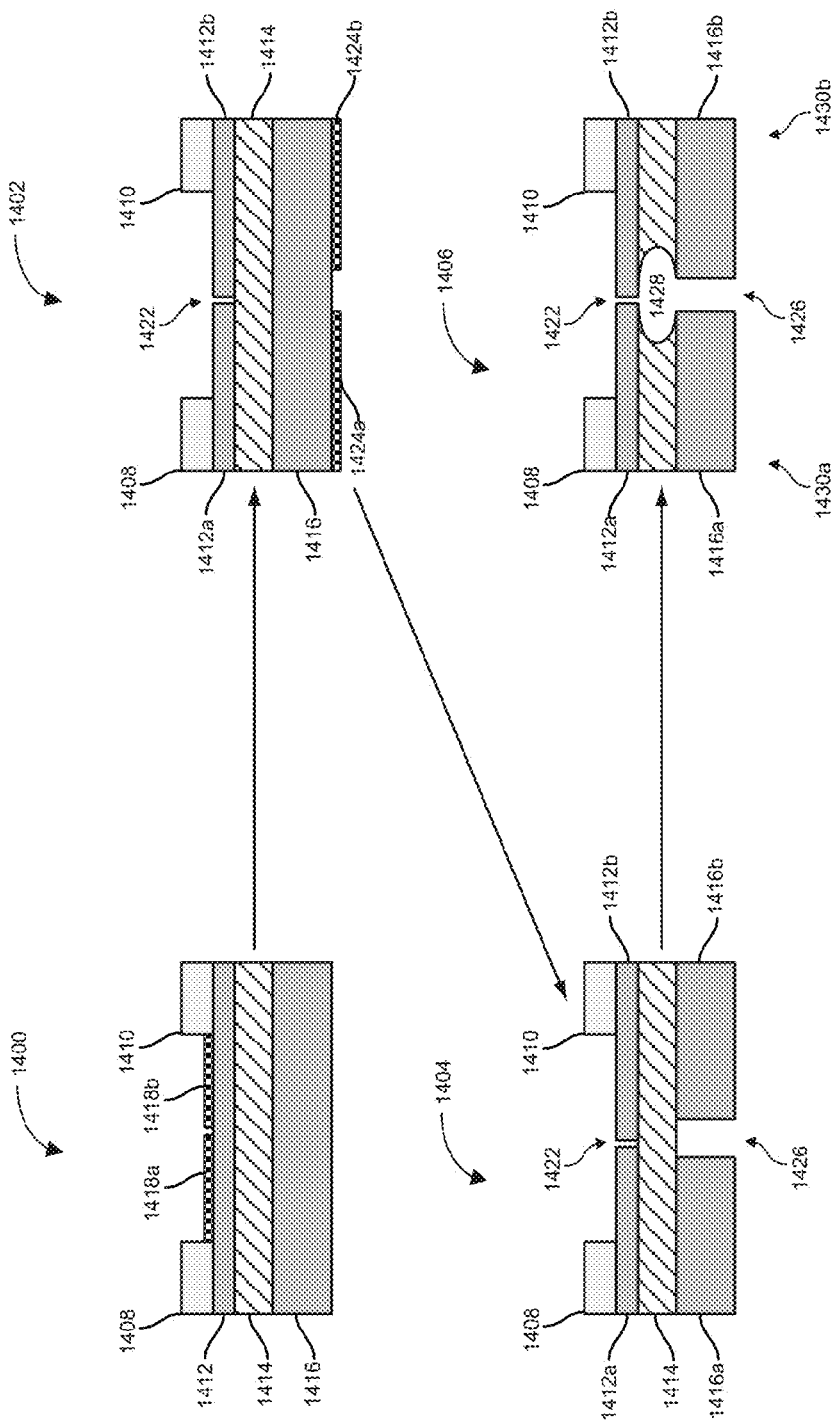
FIG. 14 illustrates example procedures in producing a MEMS sensing device according to various embodiments of the present disclosure.

FIG. 14 illustrates example procedures in producing a MEMS sensing device according to various embodiments of the present disclosure. In procedure 1400 a chip may be supplied having a laser 1408 and photo detector 1410 disposed on an epitaxial layer of silicon (silicon epi) 1412. The silicon epi 1412 may be disposed on a buried oxide (BOX) layer 1414. The BOX layer 1414 may be disposed on a silicon substrate 1416. In embodiments, photomask layers 1418a and 1418b may be formed on silicon epi 1412 such that a gap may be defined between the photomask layers revealing a portion of silicon epi 1412. In embodiments, silicon epi 1412 may be configured to act as a waveguide.

In procedure 1402 the portion of silicon epi layer 1412 revealed in the gap between photomask layers 1418a and 1418b may be etched fully until BOX layer 1414 is revealed. As a result, silicon epi layer may be divided into separate sections 1412a and 1412b having a gap 1422 therebetween. In embodiments, gap 1422 may be configured such that 1412a and 1412b may be optically coupled. In addition, photomask layers 1424a and 1424b may be formed on silicon substrate 1416 such that a gap may be defined between the photomask layers revealing a portion of silicon substrate 1416.

In procedure 1404 the portion of silicon substrate revealed between photomask layer 1424a and 1424b may be etched, via a deep reactive ion etch for example, until the BOX layer 1414 is reached. As a result, the silicon substrate 1416 may be formed into two sections 1416a and 1416b having a gap 1426 therebetween. In procedure 1406 the BOX layer 1414 may have a void etched, via use of a hydrogen fluoride (HF) vapor etching for example, through the BOX layer 1414 creating a gap 1428 and resulting in two separate pieces 1430a and 1430b being formed from the original chip. In embodiments, substrate 1416a or 1416b may be part of a frame, such as that previously discussed in reference to FIG. 1 or 6-8 and the other of the two sections of silicon 1416b or 1416a, respectively, may be part of a proof mass. This may result in either of the two separate pieces 1430a or 1430b being fixed in place and the other of the two separate pieces, 1430b or 1430a being moveable, respectively.

Figure 15:
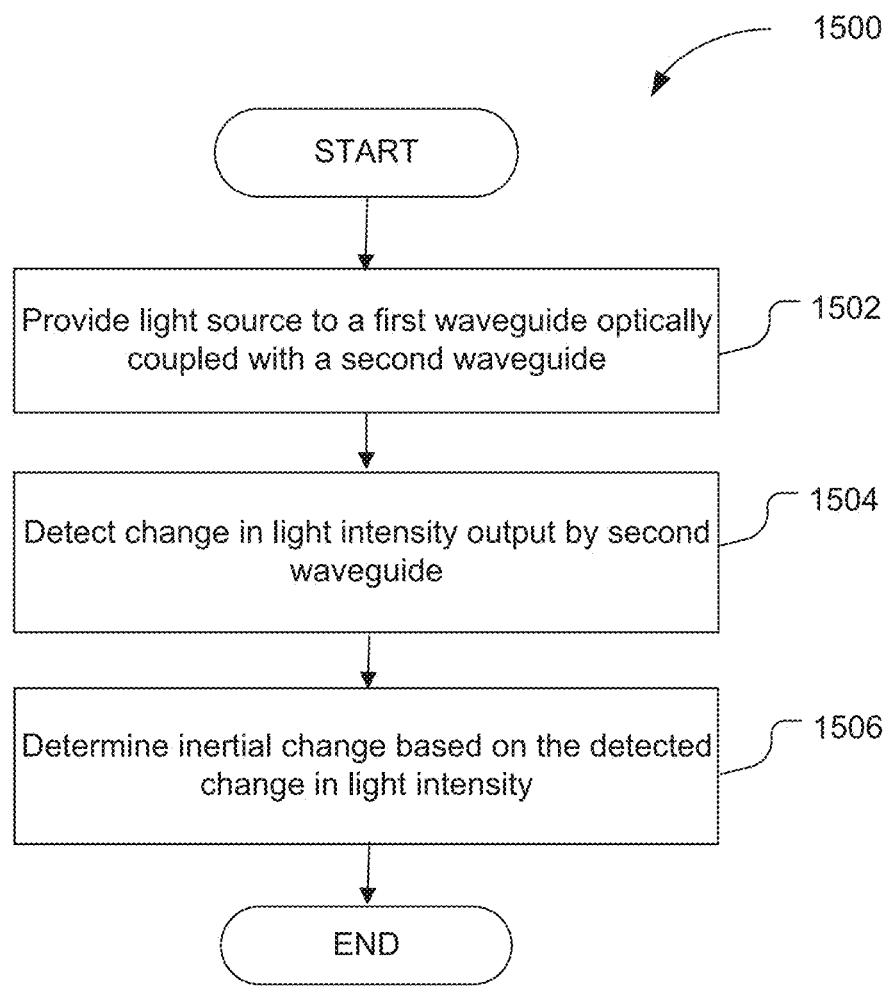
FIG. 15 schematically illustrates a flow diagram for a method of operating a MEMS sensing device, in accordance with some embodiments.

FIG. 15 is a process flow diagram illustrating operation of a MEMS sensing device, in accordance with some embodiments. The process 1500 may begin at block 1502, where a light source is provided to a first waveguide. In embodiments, the first waveguide may be optically coupled with a second waveguide.

At block 1504, a change in light intensity output by the second waveguide may be detected. The change may occur in response to a displacement of either the first or second waveguide relative to one another. As described above, the displacement may occur as a result of external acceleration applied to the MEMS sensing device or an apparatus including the MEMS sensing device and may involve more than one input and more than one output waveguide.

At block 1506, inertial change (e.g., external acceleration or rotation) applied to the MEMS sensing device (or an apparatus including the MEMS sensing device) may be determined, based on the detected light intensity change.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system or apparatus using any suitable hardware and/or software to configure as desired.

Figure 16:
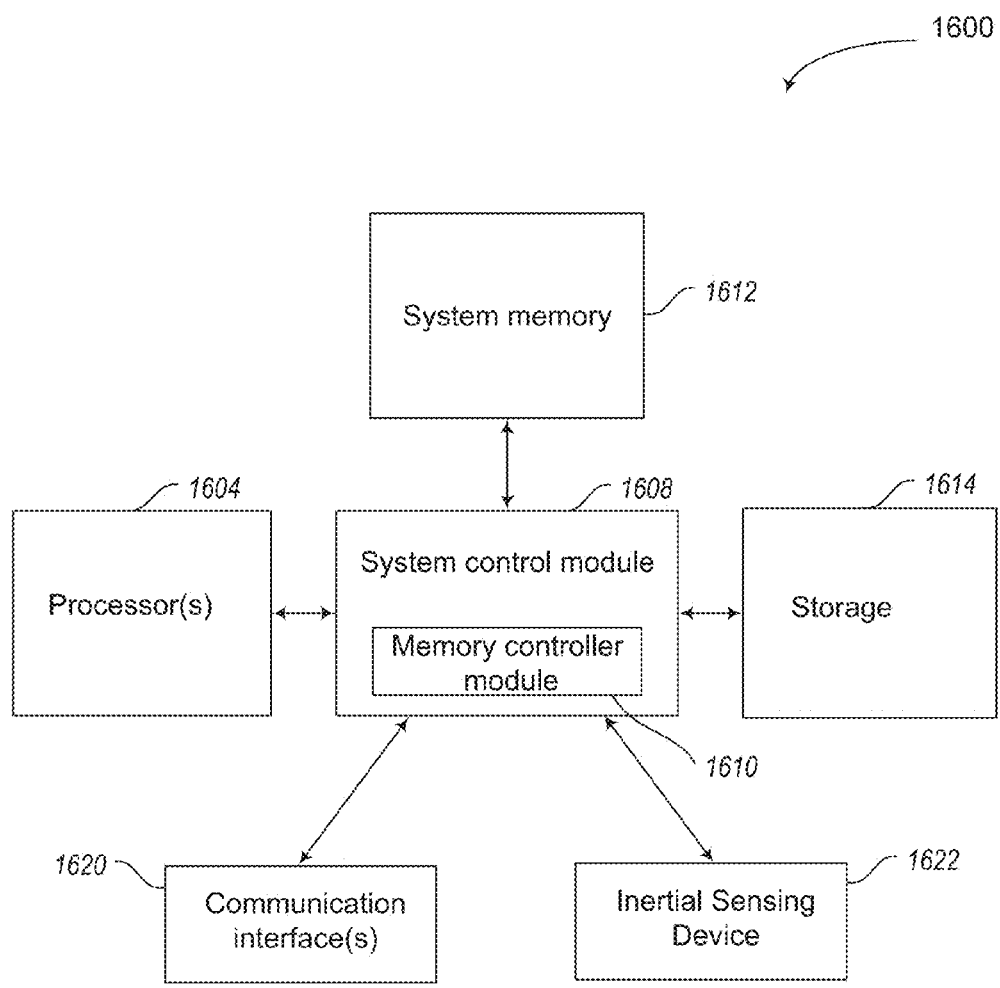
FIG. 16 schematically illustrates an example computing device including a MEMS sensing device, in accordance with some embodiments.

FIG. 16 schematically illustrates an example computing device including a MEMS sensing device, in accordance with some embodiments. FIG. 16 illustrates, for one embodiment, an example system 1600 having one or more processor(s) 1604, system control module 1608 coupled to at least one of the processor(s) 1604, system memory 1612 coupled to system control module 1608, non-volatile memory (NVM)/storage 1614 coupled to system control module 1608, and one or more communications interface(s) 1620 coupled to system control module 1608.

In some embodiments, the system 1600 may include an inertial sensing device 1622 such as the MEMS sensing devices 100, 600, 700, 800, or 900, described above and provide logic/module that performs functions aimed at detecting change of light intensity and calculating external acceleration and/or rotation applied to the system and/or other modules described herein. In some embodiments, the system 1600 may include one or more computer-readable media (e.g., system memory or NVM/storage 1614) having instructions and one or more processors (e.g., processor(s) 1604) coupled with the one or more computer-readable media and configured to execute the instructions to implement a module to perform light intensity change detection and inertial change calculation actions described herein.

System control module 1608 for one embodiment may include any suitable interface controllers to provide for any suitable interface to at least one of the processor(s) 1604 and/or to any suitable device or component in communication with system control module 1608.

System control module 1608 may include memory controller module 1610 to provide an interface to system memory 1612. The memory controller module 1610 may be a hardware module, a software module, and/or a firmware module. System memory 1612 may be used to load and store data and/or instructions, for example, for system 1600. System memory 1612 for one embodiment may include any suitable volatile memory, such as suitable DRAM, for example. System control module 1608 for one embodiment may include one or more input/output (I/O) controller(s) to provide an interface to NVM/storage 1614 and communications interface(s) 1620.

The NVM/storage 1614 may be used to store data and/or instructions, for example. NVM/storage 1614 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 1614 may include a storage resource physically part of a device on which the system 1600 is installed or it may be accessible by, but not necessarily a part of, the device. For example, the NVM/storage 1614 may be accessed over a network via the communications interface(s) 1620.

Communications interface(s) 1620 may provide an interface for system 1600 to communicate over one or more network(s) and/or with any other suitable device. The system 1600 may wirelessly communicate with the one or more components of the wireless network in accordance with any of one or more wireless network standards and/or protocols.

For one embodiment, at least one of the processor(s) 1604 may be packaged together with logic for one or more controller(s) of system control module 1608, e.g., memory controller module 1610. For one embodiment, at least one of the processor(s) 1604 may be packaged together with logic for one or more controllers of system control module 1608 to form a System in Package (SiP). For one embodiment, at least one of the processor(s) 1604 may be integrated on the same die with logic for one or more controller(s) of system control module 1608. For one embodiment, at least one of the processor(s) 1604 may be integrated on the same die with logic for one or more controller(s) of system control module 1608 to form a System on Chip (SoC).

In various embodiments, the system 1600 may have more or less components, and/or different architectures. For example, in some embodiments, the system 1600 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 1600 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra-mobile PC, a mobile phone, a desktop computer, a server, a printer, a scanner, a monitor, a set-top box, an entertainment control unit, a digital camera, a portable music player, or a digital video recorder. In further implementations, the system 1600 may be any other electronic device.

The embodiments described herein may be further illustrated by the following examples. Example 1 is a micro-electro-mechanical system (MEMS) apparatus, comprising: a laser arrangement configured to generate a light beam; a first waveguide configured to receive and output the light beam; and a second waveguide, substantially aligned endface to endface with the first waveguide, the second waveguide configured to receive at least a portion of the light beam from the first waveguide via optical coupling through the substantially aligned endfaces, wherein either the first or second waveguide is configured to be moveable in response to an inertial change of the apparatus, and wherein movement of the first or second waveguide causes a corresponding change in light intensity of the portion of the light beam that indicates a measure of the inertial change.

Example 2 may include the subject matter of Example 1, further comprising a detector coupled with the second waveguide configured to detect the change in light intensity of the portion of the light beam, to determine the inertial change.

Example 3 may include the subject matter of Example 1, further comprising a third waveguide substantially aligned endface to endface with another endface of the second waveguide, the third waveguide configured to receive at least some of the portion of the light beam from the second waveguide via optical coupling through the substantially aligned endfaces of the second and third waveguides, wherein the second waveguide is configured to be moveable via disposition of the second waveguide on a proof mass suspended between the first and third waveguides.

Example 4 may include the subject matter of Example 3, further comprising a detector coupled with the third waveguide configured to detect the change in light intensity of the portion of the light beam.

Example 5 may include the subject matter of Example 1, wherein the first waveguide is configured with a number of additional endfaces through which to output portions of the light beam and the second waveguide is one of a corresponding number of waveguides, where individual waveguides, of the corresponding number of waveguides, are substantially aligned endface to endface with respective ones of the additional endfaces of the first waveguide, the corresponding number of waveguides configured to receive respective portions of the light beam via optical coupling with respective endfaces of the first waveguide.

Example 6 may include the subject matter of Example 5, wherein to have either the first or second waveguide configured to be moveable further comprises having either the number of endfaces of the first waveguide or the corresponding number of waveguides configured to be moveable, respectively.

Example 7 may include the subject matter of Example 6, wherein the corresponding number of waveguides are coupled with respective detectors configured to detect changes in light intensity of the respective portions of the light beam to determine the inertial change.

Example 8 may include the subject matter of Example 7, wherein the number of endfaces configured to output the light beam are spaced either fractionally closer together or fractionally farther apart than a spacing between the endfaces of the corresponding number of waveguides.

Example 9 may include the subject matter of Example 8, wherein movement of either the number of endfaces of the first waveguide or the corresponding number of waveguides results in a decrease of light intensity of the portion of the light beam received by one of the individual waveguides and an increase in light intensity of the portion of the light beam received by another of the individual waveguides.

Example 10 may include the subject matter of Example 9, wherein the one of the individual waveguides is adjacent to the another of the individual waveguides.

Example 11 may include the subject matter of Example 10, wherein the increase of the light intensity received by the another of the individual waveguides is indicative of a direction of the inertial change of the apparatus.

Example 12 may include the subject matter of Example 1, further comprising a proof mass structure movably affixed to a frame such that the proof mass structure is movable in at least one direction relative to the frame, wherein at least a portion of either the first or second waveguide is disposed on the first proof mass structure, wherein a movement of the proof mass structure causes a change in the endface to endface alignment of the first waveguide and second waveguide.

Example 13 may include the subject matter of Example 12, wherein the proof mass structure is affixed to the frame by at least two springs.

Example 14 may include the subject matter of Example 12, wherein an external acceleration of the frame causes the movement of the proof mass structure.

Example 15 may include the subject matter of Example 14, wherein the apparatus comprises an accelerometer.

Example 16 may include the subject matter of any one of Examples 12-14, wherein the apparatus comprises a first assembly, wherein the apparatus further includes a second assembly comprising: a third waveguide configured to receive and output a second light beam; a fourth waveguide substantially aligned endface to endface with the third waveguide, the fourth waveguide configured to receive at least a portion of the second light beam from the third waveguide via optical coupling through the substantially aligned endfaces, wherein either the third or fourth waveguide is configured to be moveable in response to another inertial change of the apparatus and movement of the third or fourth waveguide causes a corresponding change in light intensity of the portion of the second light beam that indicates a measure of the another inertial change.

Example 17 may include the subject matter of Example 16, wherein the proof mass structure is a first proof mass structure and the fourth waveguide is disposed on a second proof mass structure, wherein a movement of the second proof mass structure causes a change to the endface to endface alignment of the first waveguide and second waveguide.

Example 18 may include the subject matter of Example 17, wherein the second proof mass structure is movably affixed to the frame such that the proof mass structure is movable at least in another direction relative to the frame, the another direction being perpendicular to the at least one direction.

Example 19 may include the subject matter of Example 18, wherein an external rotation of the frame causes the movement of the second proof mass structure.

Example 20 may include the subject matter of Example 19, wherein the second proof mass is disposed on the first proof mass.

Example 21 may include the subject matter of Example 16, wherein the apparatus comprises a gyroscope.

Example 22 is a method for detecting inertial change in an apparatus, comprising:

providing, by a light source generation unit of an apparatus, a light beam to a first waveguide, the first waveguide having an endface optically coupled with an endface of a second waveguide to cause the second waveguide to transmit at least a portion of the light beam, wherein either the first or second waveguide is moveable in response to an inertial change of the apparatus; and detecting, by a detection module of the apparatus, in response to an inertial change of the apparatus, a change in light intensity of the portion of the light beam transmitted by the second waveguide, the change caused by a movement of either the first or second waveguide relative to the second or first waveguide, respectively, the change indicating a measure of the inertial change of the apparatus.

Example 23 may include the subject matter of Example 22, wherein the inertial change includes at least one of external rotation or acceleration of the apparatus.

Example 24 is a computing device comprising: a processor; and a micro-electro-mechanical system (MEMS) apparatus coupled with the processor, the MEMS apparatus comprising: a laser arrangement configured to generate a light beam; a first waveguide configured to receive and output the light beam; a second waveguide, substantially aligned endface to endface with the first waveguide, the second waveguide configured to receive at least a portion of the light beam from the first waveguide via optical coupling through the substantially aligned endfaces, wherein either the first or second waveguide is configured to be moveable in response to an inertial change of the mobile computing device, and wherein movement of the first or second waveguide causes a change in light intensity of the portion of the light beam; and a detector coupled with the second waveguide configured to detect the change in light intensity of the portion of the light beam and output a signal to the processor, the signal indicating the measure of light intensity, wherein the processor is configured to determine an inertial change of the mobile computing device based upon the signal.

Example 25 may include the subject matter of Example 24, wherein the computing device is a mobile computing device selected from a group consisting of a laptop, netbook, notebook, ultrabook, smartphone, tablet, or personal digital assistant (PDA).

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. A micro-electro-mechanical system (MEMS) apparatus, comprising:

a first waveguide; and a second waveguide, substantially aligned endface to endface with the first waveguide, wherein at least a portion of the second waveguide is disposed on a movable proof mass structure, wherein one of the first or second waveguide is to receive at least a portion of the a light beam from another one of the first or second waveguide via optical coupling through the substantially aligned endfaces, wherein a movement of the proof mass structure in response to an inertial change of the apparatus results in a shearing motion of the second waveguide relative to the first waveguide, such that a longitudinal axis of the at least a portion of the second waveguide is to move in the shearing motion relative to a longitudinal axis of the first waveguide whereby an endface of the first waveguide and an endface of the second waveguide are parallel during the shearing motion, and wherein movement of the endface of the second waveguide relative to a corresponding endface of the first waveguide that results from the movement of the longitudinal axis of the at least a portion of the second waveguide relative to the longitudinal axis of the first waveguide causes a corresponding change in light intensity of the portion of the light beam that indicates a measure of the inertial change.

2. The apparatus of claim 1, wherein the one of the first or second waveguide is a second waveguide, wherein the other one of the second or first waveguide is a first waveguide, wherein the endface of the second waveguide is a first endface, and is substantially aligned with the corresponding endface of the first waveguide, wherein the apparatus further comprises a third waveguide with an endface substantially aligned with a second endface of the second waveguide, wherein the third waveguide is to receive at least some of the portion of the light beam from the second waveguide via optical coupling through the substantially aligned endfaces of the second and third waveguides, wherein the proof mass is suspended between the first and third waveguides and is movable in response to the inertial change.

3. The apparatus of claim 1, further comprising: a laser arrangement coupled with the one of the first or second waveguide, to generate the light beam, and a detector coupled with the other one of the first or second waveguide, to detect the change in light intensity of the portion of the light beam.

4. The apparatus of claim 1, wherein the first waveguide includes a number of additional endfaces through which to output portions of the light beam and the second waveguide is one of a corresponding number of waveguides, where individual waveguides, of the corresponding number of waveguides, are substantially aligned endface to endface with respective ones of the additional endfaces of the first waveguide, wherein the corresponding number of waveguides is to receive respective portions of the light beam via optical coupling with respective endfaces of the first waveguide.

5. The apparatus of claim 4, wherein the corresponding number of waveguides are to be moveable in the shearing motion.

6. The apparatus of claim 5, wherein the corresponding number of waveguides are coupled with respective detectors to detect changes in light intensity of the respective portions of the light beam to determine the inertial change.

7. The apparatus of claim 6, wherein the number of endfaces to output the light beam are spaced either fractionally closer together or fractionally farther apart than a spacing between the endfaces of the corresponding number of waveguides.

8. The apparatus of claim 7, wherein movement of either the number of endfaces of the first waveguide or the corresponding number of waveguides results in a decrease of light intensity of the portion of the light beam received by one of the individual waveguides and an increase in light intensity of the portion of the light beam received by another of the individual waveguides.

9. The apparatus of claim 8, wherein the one of the individual waveguides is adjacent to the another of the individual waveguides.

10. The apparatus of claim 9, wherein the increase of the light intensity received by the another of the individual waveguides is indicative of a direction of the inertial change of the apparatus.

11. The apparatus of claim 1, wherein the proof mass structure is movably affixed to a frame of the apparatus, such that the proof mass structure is movable in at least one direction relative to the frame, wherein a movement of the proof mass structure causes a change in an endface to endface alignment of the first waveguide and second waveguide.

12. The apparatus of clam 11, wherein the proof mass structure is affixed to the frame by at least two springs.

13. The apparatus of claim 11, wherein an external acceleration of the frame causes the movement of the proof mass structure.

14. The apparatus of claim 13, wherein the apparatus comprises an accelerometer.

15. The apparatus of claim 11, wherein the proof mass structure is a first proof mass structure, wherein the laser arrangement and the first and second waveguides comprise a first assembly, wherein the apparatus further includes a second proof mass structure that is movably affixed to the frame such that the second proof mass structure is movable at least in another direction relative to the frame, wherein the another direction is perpendicular to the at least one direction.

16. The apparatus of claim 15, wherein the apparatus further includes a second assembly having components similar to those of the first assembly and disposed on the second proof mass structure.

17. The apparatus of claim 16, wherein the inertial change is a first inertial change, wherein an external rotation of the frame causes the movement of the second proof mass structure, wherein the movement of the second proof mass structure corresponds to a second inertial change, to be detected by the second assembly.

18. The apparatus of claim 17, wherein the second proof mass structure is disposed on the first proof mass structure.

19. The apparatus of claim 15, wherein the apparatus comprises a gyroscope.

20. A method for detecting inertial change in an apparatus, comprising:

providing, by a light source generation unit of an apparatus, a light beam to a first waveguide, the first waveguide having an endface optically coupled with an endface of a second waveguide to cause the second waveguide to transmit at least a portion of the light beam, wherein at least a portion of one of the first or second waveguide is disposed on a proof mass structure that is moveable in a shearing motion in response to an inertial change of the apparatus, resulting in a movement of a longitudinal axis of the at least a portion of the one of the first or second waveguide in the shearing motion relative to a longitudinal axis of another one of the first or second waveguide, and in a correspondent movement of an endface of the one of the first or second waveguide in the shearing motion relative to a corresponding endface of the other one of the first or second waveguide whereby the endface of the first waveguide and the endface of the second waveguide are parallel during the shearing motion; and detecting, by a detection module of the apparatus, in response to the inertial change of the apparatus, a change in light intensity of the portion of the light beam transmitted by the second waveguide, the change caused by the movement of the endface of the one of the first or second waveguide in the shearing motion relative to the corresponding endface of the other one of the first or second waveguide, respectively, the change indicating a measure of the inertial change of the apparatus.

21. The method of claim 20, wherein the inertial change includes at least one of external rotation or acceleration of the apparatus.

22. A computing device comprising:
a processor; and
a micro-electro-mechanical system (MEMS) apparatus coupled with the processor, the MEMS apparatus comprising:
  a first waveguide;
  a second waveguide, substantially aligned endface to endface with the first waveguide, wherein at least a portion of the second waveguide is disposed on a movable proof mass structure, wherein one of the first or second waveguide is to receive at least a portion of a light beam from another one of the first or second waveguide via optical coupling through the substantially aligned endfaces, wherein a movement of the proof mass structure in response to an inertial change of the computing device results in a shearing motion of the second waveguide relative to the first waveguide, such that a longitudinal axis of the at least a portion of the second waveguide is to move in the shearing motion relative to a longitudinal axis of the first waveguide, respectively, and wherein the movement of the second waveguide relative to the first waveguide causes a movement of an endface of the second waveguide relative to a corresponding endface of the first waveguide, which results in a change in light intensity of the portion of the light beam whereby the endface of the first waveguide and the endface of the second waveguide are parallel during the shearing motion; and
  a detector coupled with the one of the first or second waveguide to detect the change in light intensity of the portion of the light beam and output a signal to the processor, the signal indicating a measure of light intensity, wherein the processor is to determine an inertial change of the computing device based upon the signal.

23. The computing device of claim 22, wherein the computing device is a mobile computing device selected from a group consisting of a laptop, netbook, notebook, ultrabook, smartphone, tablet, or personal digital assistant (PDA).

24. The computing device of claim 22, wherein the MEMS apparatus further comprises a laser arrangement to generate the light beam, wherein the laser arrangement is coupled with the other one of the first or second waveguide.

\* \* \* \* \*